US010346791B2

(12) United States Patent
Brannon et al.

(10) Patent No.: US 10,346,791 B2
(45) Date of Patent: Jul. 9, 2019

(54) AUTOMATED ADDITIVE INVENTORY AND DELIVERY LOGISTICS CONTROL SYSTEM AND METHOD THEREOF

(71) Applicants: Martha Cheryl Justice, New Braunfels, TX (US); Harold Brannon, Magnolia, TX (US); Blake C. Burnette, Tomball, TX (US); Ronnie D. Hughes, Montgomery, TX (US); Brent Naizer, Tomball, TX (US)

(72) Inventors: Harold Brannon, Magnolia, TX (US); Blake C. Burnette, Tomball, TX (US); Ronnie D. Hughes, Montgomery, TX (US); Brent Naizer, Tomball, TX (US); Ted Reed, New Braunfels, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 1249 days.

(21) Appl. No.: 13/896,813

(22) Filed: May 17, 2013

(65) Prior Publication Data
US 2014/0344117 A1 Nov. 20, 2014

(51) Int. Cl.
G06Q 10/08 (2012.01)
G06K 17/00 (2006.01)

(52) U.S. Cl.
CPC ................. G06Q 10/087 (2013.01)

(58) Field of Classification Search
CPC .. G06Q 10/087; G06Q 10/08; G06Q 10/0875; G06Q 10/06; G06Q 20/203
USPC .......................................................... 705/28
See application file for complete search history.

(56) References Cited

U.S. PATENT DOCUMENTS

| 5,016,666 A | * | 5/1991 | McKinney ............... B67D 7/02 |
| | | | 137/1 |
| 5,297,423 A | | 3/1994 | Keating et al. |
| 5,762,118 A | | 6/1998 | Epworth et al. |
| 6,137,417 A | | 10/2000 | McDermott |
| 6,822,565 B2 | | 11/2004 | Thomas et al. |
| 7,092,897 B2 | * | 8/2006 | Wallace ................. G06K 17/00 |
| | | | 700/9 |
| 2010/0115925 A1 | | 5/2010 | Charbonneau |

(Continued)

OTHER PUBLICATIONS

Ayala, Salvador, et al. "Improving Oilfield Service Efficiency" Oilfield Review, Autumn 2003, www.slb.com, Schlumberger, pp. 69-79.

(Continued)

*Primary Examiner* — Garcia Ade
(74) *Attorney, Agent, or Firm* — Cantor Colburn LLP (57) ABSTRACT

A process of managing inventory and delivery logistics of one or more chemical additives used at a well treatment site. The process includes placing one or more bulk containers at the well treatment site to maintain inventory capacity for one or more chemical additives on-site for a well treatment procedure. Monitoring chemical additive inventory within the one or more bulk containers. Making a determination, based on monitored chemical additive inventory, whether additional additive is needed in the one or more bulk containers; generating, based on the determination, initiation of an order for delivery of additional additive. delivering the additional additive in a delivery bulk container to the well treatment site. Also included is an automated additive inventory and delivery logistics control system.

18 Claims, 4 Drawing Sheets

(56) References Cited

U.S. PATENT DOCUMENTS

2011/0257819 A1    10/2011   Chen et al.
2012/0188076 A1     7/2012   McSheffrey

OTHER PUBLICATIONS

Carl T. Montgomery and Michael B. Smith, NSI Technologies, "Hydraulic Fracturing" The Fuss, The Facts, The Future, History of an Enduring Technology, JPT Dec. 2010; Journal of Petroleum Technology, pp. 26-41.

* cited by examiner

AUTOMATED ADDITIVE INVENTORY AND DELIVERY LOGISTICS CONTROL SYSTEM AND METHOD THEREOF

BACKGROUND

Hydraulic fracturing is a technique by which the production of natural resources, such as natural gas and petroleum, for example, can be stimulated or increased. The process of hydraulic fracturing includes inducing fractures in a rock layer using pressurized fluid. The process may also include the use of chemical additives mixed into the fluid. In addition to chemical additives, sand, which is typically stored in sand silos, may also be used as an additive in the process. Some additives may need to be continuously delivered during the production process, but the treatment may stop and start at undetermined intervals. As a result, the exact amount of additive needed may not be easily determined a priori.

Figure 1:
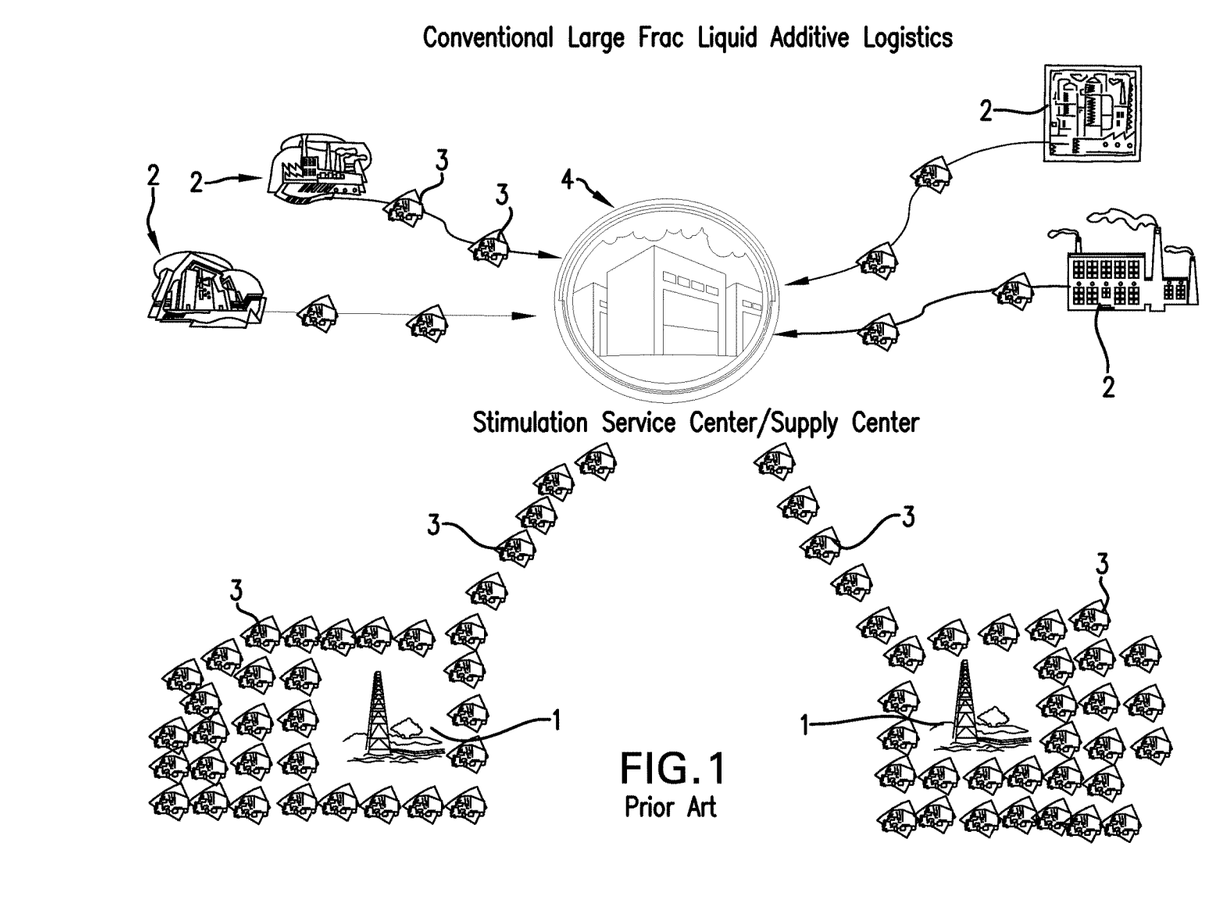
FIG. 1 illustrates the current process for managing hydraulic fracturing chemical additive supply logistics for well sites.

FIG. 1 illustrates the current process for managing hydraulic fracturing chemical additive supply logistics on oil and gas well sites 1. The chemical additives are typically supplied from a manufacturer 2 packaged in drums or portable totes 3 to one or more intermediate warehousing or inventory storage facilities 4, which stores a thirty day inventory of each chemical additive for each well site. A typical truckload can transport 14 totes at a time. When a site 1 requires 32,000 gal of each of four liquid additive products, a delivery of 28 truckloads will be required to provide nearly 400 totes 3 at the site 1. When additional additives are required at a site 1, as determined via manual intervention in measuring and/or requesting additional additives, the drums or portable totes 3 containing the needed additional additives are then delivered from the district warehouse 4 to a site 1 and dropped off at the site 1. Each of the drum or totes 3 must be transferred and/or plumbed into the hydraulic fracturing fluid processing system using conveyances such as hoses. As can be appreciated, a typical job will result in a large number of totes 3 on sites 1 with packaging, handling, delivery, and facilities costs to absorb, as well as a large number of interconnections to manage and delivery logistics to arrange.

SUMMARY

A process of managing inventory and delivery logistics of one or more chemical additives used at a well treatment site, the process includes placing one or more bulk containers at the well treatment site to maintain inventory capacity for one or more chemical additives on-site for a well treatment procedure; monitoring chemical additive inventory within the one or more bulk containers; making a determination, based on monitored chemical additive inventory, whether additional additive is needed in the one or more bulk containers; generating, based on the determination, initiation of an order for delivery of additional additive; and, delivering the additional additive in a delivery bulk container to the well treatment site.

An automated additive inventory and delivery logistics control system includes one or more bulk containers positioned at a well treatment site, the one or more bulk containers configured to indicate a quantity of an additive therein; and, a monitoring system positioned remotely from the one or more bulk containers, the monitoring system configured to automatically receive information from the one or more bulk containers regarding the quantity of an additive therein.

BRIEF DESCRIPTION OF THE DRAWINGS

Referring now to the drawings wherein like elements are numbered alike in the several Figures.

DETAILED DESCRIPTION

As noted above, current hydraulic fracturing processes include manual measurement of additive levels or manual generation of requests for additional additives (chemicals or sand). Embodiments of the invention described herein include a system and method to automatically monitor the level information of one or more additives at one or more hydraulic fracturing sites. The system is also capable of determining a need for additional additives and generating alerts for additional deliveries as needed.

Figure 2:
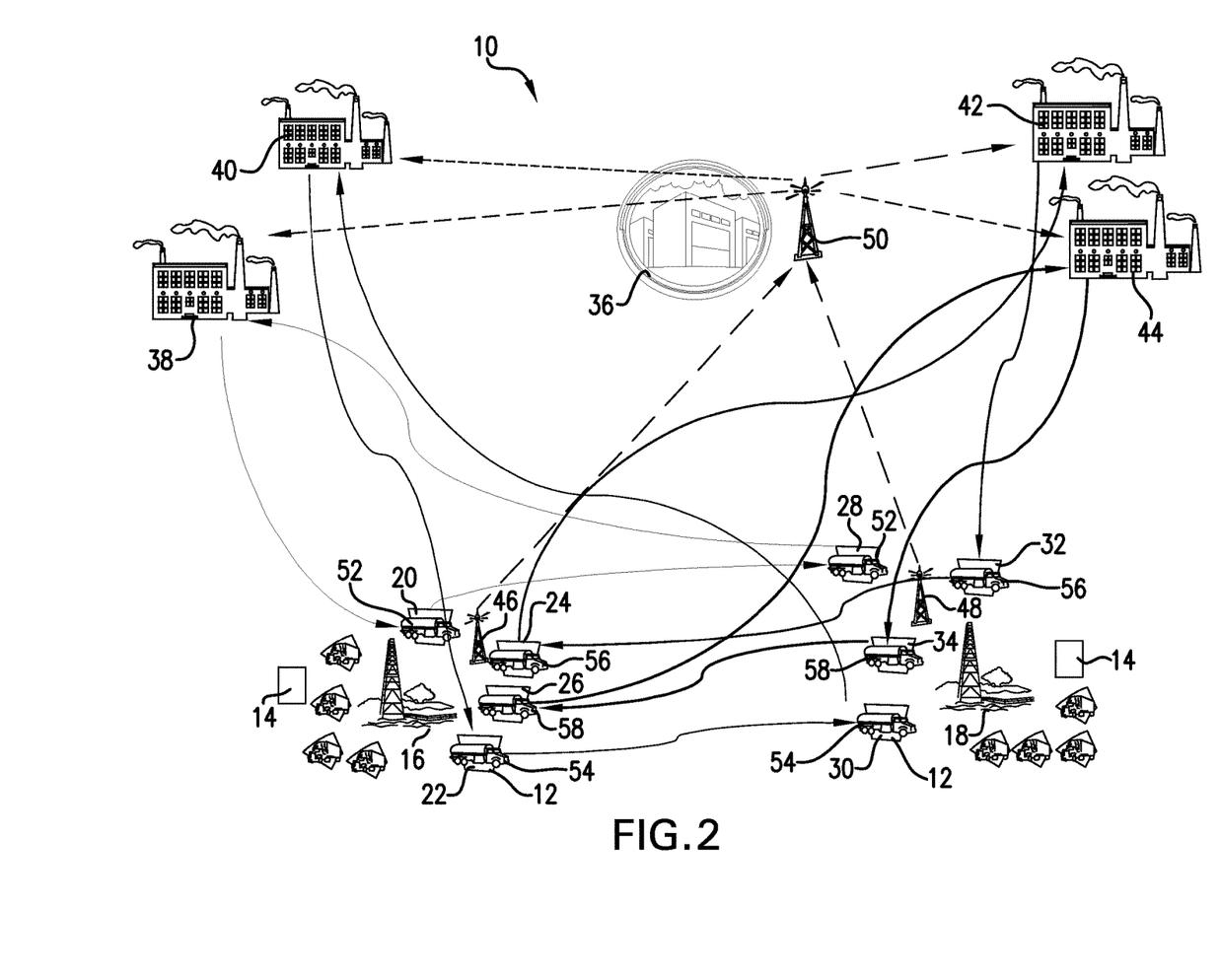
FIG. 2 illustrates an exemplary embodiment of a system to automatically manage an additive inventory and delivery logistics according to an embodiment of the invention.

FIG. 2 illustrates an exemplary embodiment of an automated additive inventory and delivery logistics control system 10. The system 10 includes one or more bulk containers or tanks 12 such as liquid additive system ("LAS") tanks that store chemical additives, for example. The system 10 also includes other additive storage containers such as one or more sand silos 14, for example. In an exemplary embodiment, one or more of the containers 12 and silos 14 are intermodal containers also known as ISO containers, which are standardized containers with sizes standardized by the International Organization for Standardization ("ISO"). Intermodal containers can be moved from one mode of transport to another without unloading and reloading the contents of the container. The one or more containers 12 and silos 14 are hereinafter referred to as bulk containers and may include a height and width or radius of about 8 feet, a typical length of at least 20 feet, and a volume of at least 1,000 cubic feet, having a capacity of at least approximately 7,500 gallons, which is far greater than the typical 275 gallon capacity of a tote.

While various sizes of the bulk containers are available within the ISO container specifications, it should be understood that the bulk containers and silos 12, 14 described herein are differentiated from smaller pallet-sized tote boxes. Conventionally, as shown in FIG. 1, chemical additives for use at hydraulic fracturing sites 1 are deposited within totes 3 by various chemical manufacturers 2, and delivered and stored at a supply center 4 that services one or more hydraulic fracturing sites 1. Up to a 30 day supply of totes 3 for each additive at each hydraulic fracturing site 1 is typically housed within the supply center 4, and an average of fourteen totes 3 can be delivered within a truckload. The hydraulic fracturing site 1 itself can include hundreds of totes 3 for holding the chemical additives necessary for a hydraulic fracturing operation. After each tote 3 is depleted of chemical additive, the empty tote 3 must be stored on site 1 until removed. Also, when a new tote 3 is needed, hosing connections must be moved from an empty tote 3 to a new tote 3 which increases a risk of leaks and spills. Thus, the bulk containers 12, 14 replace the previously employed totes 3 for storage of large volume additives, and are able to be refilled at the hydraulic fracturing site as needed rather than being replaced, as will be further described below.

With reference again to FIG. 2, an exemplary embodiment of the automated additive inventory and delivery logistics control system 10 monitors additive levels and controls additive delivery to a first hydraulic fracturing site 16, a well treatment site, and a second hydraulic fracturing site 18. While two hydraulic fracturing sites 16, 18 are illustrated, it should be understood that any number of hydraulic fracturing sites could be monitored for controlling an inventory of additives by the system 10. Site 16 includes first, second, third, and fourth bulk containers 20, 22, 24, 26. In an exemplary embodiment, each of the first through fourth bulk containers 20 to 26 includes a different additive from each other. Similarly, site 18 includes first, second, third, and fourth bulk containers 28, 30, 32, 34 each including a different additive from each other. While four bulk containers are shown at each site 16, 18, each site 16, 18 may alternatively include more or less bulk containers. The bulk containers 20 to 34 may be trailer mounted bulk additive tanks for ease in delivery to and relocatability within the sites 16, 18. Also, one or more of the bulk containers 20 to 34 are connected by a connection, such as by hosing and/or piping, to a portion of a hydraulic fracturing system, such as a hydraulic fluid processing system. The hydraulic fluid processing system (not shown) may include a blender for blending one or more of the additives with water and proppant as needed for a particular job. Each of the bulk containers 20 to 34 further includes an additional connector for connecting with the hosing or connection feature of a transport vehicle for on-site refilling. In an exemplary embodiment, the first bulk containers 20, 28 include a first additive, the second bulk containers 22, 30 include a second additive, the third bulk containers 24, 32 include a third additive, and the fourth bulk containers 26, 34 include a fourth additive. Instead of storing all of the first, second, third, and fourth additives at a distribution center 36 or supply center, the first, second, third, and fourth additives are directly supplied to the sites 16, 18 by first, second, third, and fourth suppliers 38, 40, 42, 44, respectively, that include chemical additive manufacturers, chemical distributors, and sand suppliers. Alternatively, one or more of the first to fourth additives may be supplied by a same supplier. The distribution center 36 may be used to store "back-up" or emergency inventory in the event the additive is not immediately available from the supplier.

The bulk containers 20 to 34 are equipped with level sensors and GPS navigation devices. Site 16 also includes a monitoring system 46, which communicates with the level sensors and GPS navigation devices of each bulk container 28 to 34, and site 18 also includes a monitoring system 48, which communicates with the level sensors and GPS navigation devices of each bulk container 28 to 34. The monitoring systems 46, 48 receive the information from the bulk containers 20 to 34 and may include processors (not shown) for additionally processing the information. The system 10 further includes a dispatching system represented at 50. The dispatching system 50 can be located at the distribution center 36 or elsewhere within the system 10. The dispatching system 10 receives and monitors site inventory data from multiple sites 16, 18 via the monitoring systems 46, 48 for inventory management and reorder dispatch. Communication between the level sensors and GPS navigation devices of the bulk containers 20 to 34, the monitoring systems 46, 48, and the dispatching system 50 occurs wirelessly and automatically without manual intervention. Inventory management data can be automatically processed by a processor (not shown) located within the dispatching system 50 and can be used to generate a delivery alert in the event a level of an additive in a particular container is low and in need of refill. The delivery alert is sent to the supplier 38, 40, 42, or 44 that provides the additive. While an automated system 10 is described that does not require manual intervention to generate a delivery alert, manual override may be enabled or the delivery alert may be set up to require manual approval prior to sending to the supplier 38, 40, 42, or 44. Once the delivery alert is sent to the respective supplier 38, 40, 42, or 44, a transport vehicle 52, 54, 56, or 58 is sent from the respective supplier 38, 40, 42, or 44 with the first, second, third, or fourth additive. The transport vehicles 52, 54, 56, and 58 deliver the additional additive in bulk containers rather than in replacement totes. The additive can be delivered to the site of the container in need of refilling, and can then be subsequently delivered to any nearby sites to deliver additional additive to containers containing the same additive, thus reducing the number of future truck deliveries required. After refilling, the transport vehicle 52, 54, 56, 58 returns to the supplier 38, 40, 42, or 44 for receiving more additive in the event of another delivery alert. The transfer of additional additive from the bulk container of the transport vehicle to one or more of the bulk containers 20 to 34, via their respective connectors, can be accomplished while maintaining the connection between the one or more bulk containers 20 to 34 and the hydraulic fracturing system.

Figure 3:
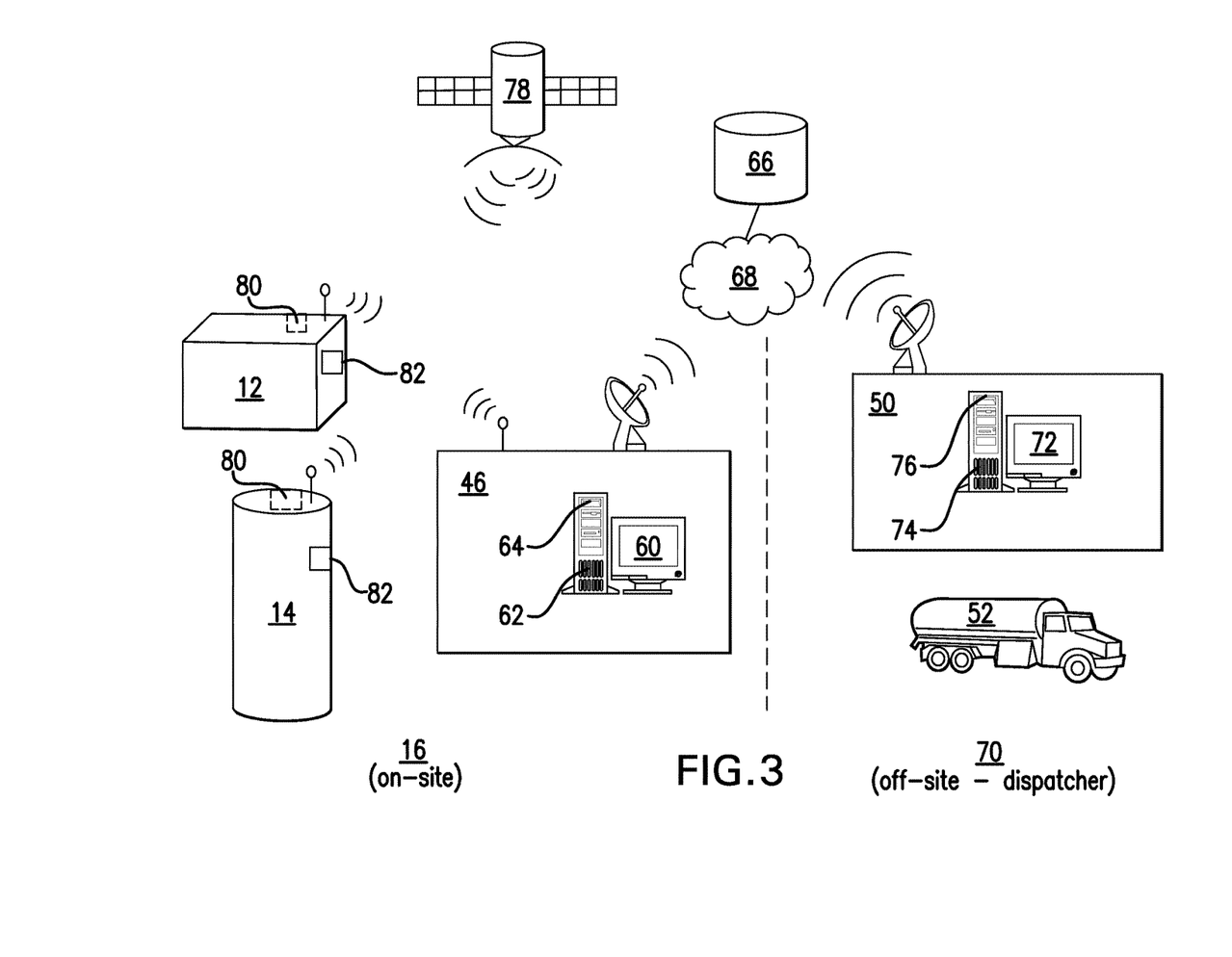
FIG. 3 illustrates an exemplary embodiment of the system of FIG. 2 to automatically generate an additive delivery alert; and, FIG. 4 is a flow diagram of an exemplary method to automatically generate an additive delivery alert according to an embodiment of the invention.

FIG. 3 illustrates the exemplary embodiment of the automated additive inventory and delivery logistics control system 10 with further details provided regarding the interaction between the bulk containers, monitoring systems, and dispatch system. For ease in description, only first hydraulic fracturing site 16 is shown instead of multiple sites, and only one bulk container 12 is depicted instead of multiple bulk containers, although it should be understood that any number of sites each including any number of bulk containers would be within the scope of these embodiments. At the hydraulic fracturing site 16, the system 10 includes the monitoring system 46 that houses a processing system 60 with one or more processors 62 and one or more memory devices 64. The monitoring system 46 is located remotely from the containers 12, 14 and may be in communication with a server 66 located at a site other than the hydraulic fracturing site 16 that is accessible via a network 68, for example. In addition to components at the hydraulic fracturing site 16 and the server 66, the system 10 also includes the dispatching system provided at a dispatch site 70. The dispatch site 70 could be located at the distribution center 36, but could be located elsewhere. In alternate embodiments, the monitoring system 46 may communicate directly with the dispatching system 50 rather than with the server 66. The dispatch site 70 may supply the additional additives via a distribution center 36, or alternatively directs a chemical supplier 38, 40, 42, 44 (FIG. 2) to supply the additional additives. In either case, the dispatching system 50 directs one or more transport vehicles 52 (and 54, 56, or 58 as shown in FIG. 2) carrying bulk containers of additional additive to supply the hydraulic fracturing site 16 with additional additive. The dispatching system 50 includes a processing system 72 with one or more processors 74 and one or more memory devices 76. Each of the different sites—hydraulic fracturing site 16, dispatch site 70, and sever 66 site—may communicate with each other wirelessly over the network 68 or may communicate via a satellite 78 such as one in a low earth orbit ("LEO") satellite system, VSAT (very small aperture terminal), cellular, or real time. Each of the containers 12, 14 includes a level sensor 80 that communicates the level of the respective container 12, 14 to the monitoring system 46. In the embodiment shown in FIG. 3, the level sensor 80 communicates level information wirelessly.

The level information is processed to determine whether an additive delivery alert should be issued. In an exemplary embodiment enabled by the configuration of system 10, automatic processing determines whether or not an additive delivery alert should be issued. Such processing may be done by the processing system 60 of the monitoring system 46, at the server 66, or by the processing system 72 of the dispatching system 50. The processing to determine whether an additive delivery alert should be issued may include predicting an amount of additive that will be used over a specified period of time based on the level information provided by the level sensor 80. In the event that more than one hydraulic fracturing site 16 is serviced by the dispatching system 50, then the system 10 may further include a global positioning system ("GPS") navigation device 82 associated with each of the containers 12, 14. The navigation device 82 provides location information of the containers 12, 14 to at least one of the monitoring system 46, server 66, and dispatching system 50 for proper dispatching of the transport vehicles 52 to a correct location.

Figure 4:
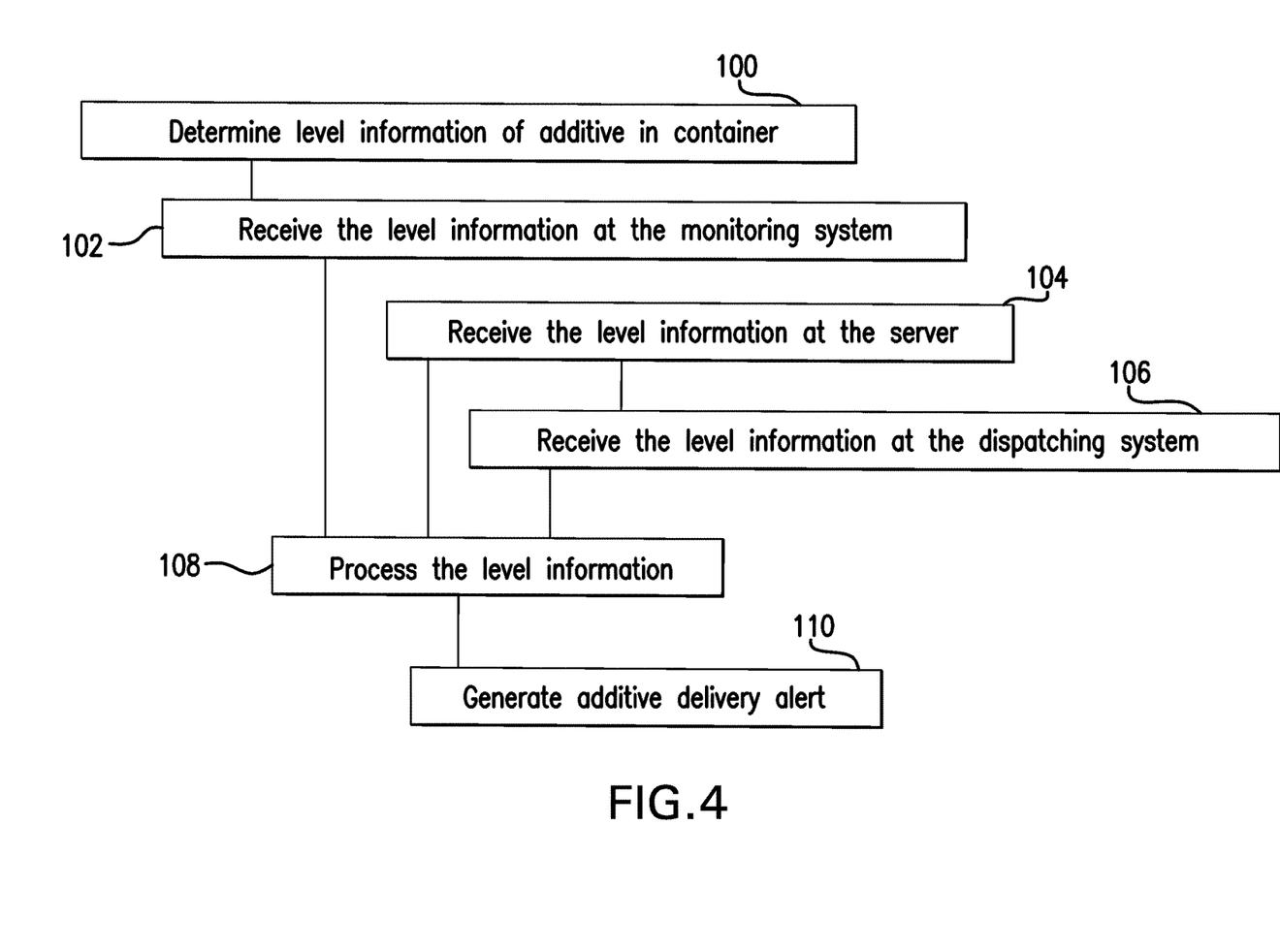

The system 10 is configured to enable the generation of an additive delivery alert. FIG. 4 is a flow diagram of an exemplary embodiment of a method using the system 10 to automatically generate the additive delivery alert. At block 100, determining level information of the additive in the container 12, 14 is performed by the level sensor 80 that transmits the level information. At block 102, receiving the level information at the monitoring system 46 may include relaying the level information to the server 66 or may be followed by processing the level information, as depicted with reference to block 108. At block 104, receiving the level information at the server 66, when relayed by the monitoring system 46, may include relaying the level information to the dispatching system 50 or may be followed by processing the level information (block 108). At block 106, the method includes receiving the level information at the dispatching system 50. At block 108, processing the level information may include predicting usage of the additive over a specified period of time (e.g., over the next three hours or any other time span entered by an operator). The processing at block 108 includes determining whether or not additional additive must be delivered to the hydraulic fracturing site to ensure that the fracturing process is not interrupted. At block 110, the method includes generating an additive delivery alert when the delivery of additional additive is determined to be needed. The delivery alert can then be automatically sent to the chemical supplier for subsequent additive delivery, although manual override may prevent the actual delivery for any reason, such as, but not limited to, if the operation is nearing completion and the additional additive is not required.

Embodiments of the present invention provide several advantages when compared with traditional systems for managing additive inventories for oilfield treatment services. For example, embodiments of the present invention can eliminate or reduce packaging costs by using refillable bulk containers versus smaller totes that are replaced after every empty. The system also reduces handling and facility costs at the sites since the number of bulk containers is far less than a number of totes. Handling and facilities costs at the distribution center are substantially reduced. The system further reduces operational labor costs due to less equipment to manage and due to the automated delivery alerts. Furthermore, the system reduces the risks related to possible spills and leaks because fewer connections are required. The savings per year in packaging, distribution center facilities/labor, location efficiencies, risk abatement, district trucking, and trucking management far exceeds the one time cost of mobile, instrumented bulk containers. The use of automated ordering helps ensure that adequate quantities of the additive are on site when needed, and can reduce the amount of time between deliveries. The use of bulk containers compared with numerous totes that are typically required also substantially reduces the equipment footprint at the well site.

While one or more embodiments have been shown and described, modifications and substitutions may be made thereto without departing from the spirit and scope of the invention. Accordingly, it is to be understood that the present invention has been described by way of illustrations and not limitation. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A process of managing inventory and delivery logistics of one or more chemical additives used at a well treatment site, the process comprising:
    placing one or more trailer-mounted ISO bulk containers at the well treatment site to maintain inventory capacity for one or more chemical additives on-site for a well treatment procedure;
    connecting at least one of the trailer-mounted ISO bulk containers to a portion of a hydraulic fluid processing system;
    monitoring chemical additive inventory within the one or more bulk containers;
    making a determination, based on monitored chemical additive inventory, whether additional additive is needed in the one or more bulk containers;
    generating, based on the determination, initiation of an order for delivery of additional additive;
    delivering the additional additive in a delivery bulk container to the well treatment site;
    and transferring the additional additive from the delivery bulk container to a respective one of the one or more trailer-mounted ISO bulk containers.

2. The process of claim 1, further comprising coupling a level sensor to each of the one or more trailer-mounted ISO bulk containers at the well treatment site, each level sensor configured to automatically transmit information regarding a level of the chemical additive in a respective trailer-mounted ISO bulk container at the well treatment site.

3. The process of claim 2, further comprising processing, at a processor located remotely from the trailer-mounted ISO bulk container at the well treatment site, the information regarding the level of the chemical additive.

4. The process of claim 3, wherein processing the information is performed at a location separate from the well treatment site.

5. The process of claim 1, further comprising transmitting information regarding a level of the chemical additive in each of the one or more trailer-mounted ISO bulk containers at the well treatment site automatically and wirelessly to a location separate from the well treatment site.

6. The process of claim 1, wherein generating initiation of an order for delivery of additional additive includes automatically, without manual intervention, generating an additive delivery alert indicating a need for the additional additive, sending the delivery alert to an additive manufacturer, and delivering the additional additive directly from the manufacturer.

7. A process of managing inventory and delivery logistics of one or more chemical additives used at a well treatment site, the process comprising:
   placing one or more trailer-mounted ISO bulk containers at the well treatment site to maintain inventory capacity for one or more chemical additives on-site for a well treatment procedure;
   coupling at least one of the one or more trailer-mounted ISO bulk containers at the well treatment site with a global positioning system navigation device, and processing location information of the at least one of the one or more trailer-mounted ISO bulk containers at the well treatment site at a remote location from the well treatment site;
   monitoring chemical additive inventory within the one or more bulk containers;
   making a determination, based on monitored chemical additive inventory, whether additional additive is needed in the one or more bulk containers;
   generating, based on the determination, initiation of an order for delivery of additional additive;
   delivering the additional additive in a delivery bulk container to the well treatment site;
   and transferring the additional additive from the delivery bulk container to a respective one of the one or more trailer-mounted ISO bulk containers.

8. The process of claim 1, wherein generating initiation of an order for delivery occurs at a dispatch system located remotely from the well treatment site, further comprising and determining, at the dispatch system, whether the additional additive is needed at a plurality of well treatment sites occurs at the dispatch system.

9. The process of claim 8, further comprising consecutively refilling at least two trailer-mounted ISO bulk containers at different well treatment sites with a same delivery bulk container carrying the additional additive.

10. The process of claim 1, further comprising predicting an amount of the chemical additive to be used in a specific period of time to determine whether additional additive is needed in each of the one or more trailer-mounted ISO bulk containers at the well treatment site.

11. The process of claim 1, wherein placing one or more trailer-mounted ISO bulk containers at the well treatment site includes placing one or more ISO containers, each having a capacity of at least 7,500 gallons, at the well treatment site.

12. The process of claim 1, further comprising maintaining connection between the respective one of the one or more trailer-mounted ISO bulk containers at the well treatment site and a hydraulic fluid processing system during transfer of additional additive from the delivery bulk container to the respective one of the one or more trailer-mounted ISO bulk containers at the well treatment site.

13. An automated additive inventory and delivery logistics control system comprising:
   one or more trailer-mounted ISO bulk containers positioned at a well treatment site, the one or more trailer-mounted ISO bulk containers configured to indicate a quantity of an additive therein, at least one of the one or more trailer-mounted bulk containers connected to a portion of a hydraulic fluid processing system;
   a global positioning system navigation device coupled with at least one of the one or more trailer-mounted ISO bulk containers; and,
   a monitoring system positioned remotely from the one or more trailer-mounted ISO bulk containers, the monitoring system configured to automatically receive information from the one or more trailer-mounted ISO bulk containers regarding a location of the one or more trailer-mounted ISO bulk containers and the quantity of an additive therein.

14. The automated additive inventory and delivery logistics control system of claim 13, wherein the one or more trailer-mounted ISO bulk containers each include a level sensor configured to indicate a quantity of an additive within the one or more trailer-mounted ISO bulk containers.

15. The automated additive inventory and delivery logistics control system of claim 14 further comprising a dispatch system located remotely from the well treatment site, the dispatch system configured to receive information from at least one of the monitoring system and the one or more trailer-mounted ISO bulk containers regarding the location of the at least one of the one or more trailer-mounted ISO bulk containers and the quantity of an additive in the one or more trailer-mounted ISO bulk containers.

16. The automated additive inventory and delivery logistics control system of claim 15, further comprising a transport vehicle carrying a delivery bulk container dispatched by the dispatch system when it is determined that additional additive is required in at least one of the one or more trailer-mounted ISO bulk containers at the well treatment site, the delivery bulk container connectable to the at least one of the one or more trailer-mounted ISO bulk containers at the well treatment site to refill the at least one of the one or more trailer-mounted ISO bulk containers at the well treatment site.

17. The automated additive inventory control and delivery logistics system of claim 13, wherein each of the one or more trailer-mounted ISO bulk containers has a capacity of at least 7,500 gallons.

18. A process of managing inventory and delivery logistics of one or more chemical additives used at a well treatment site using the automated additive inventory and delivery logistics control system of claim 13, the process comprising:
   placing the one or more trailer-mounted ISO bulk containers at the well treatment site to maintain inventory capacity for one or more chemical additives on-site for a well treatment procedure;

connecting the at least one of the trailer-mounted ISO bulk containers to the portion of the hydraulic fluid processing system;

monitoring the chemical additive inventory within the one or more bulk containers;

making a determination, based on monitored chemical additive inventory, whether additional additive is needed in the one or more bulk containers;

generating, based on the determination, initiation of an order for delivery of additional additive;

delivering the additional additive in a delivery bulk container to the well treatment site using location information from the global positioning system navigation device;

and transferring the additional additive from the delivery bulk container to a respective one of the one or more trailer-mounted ISO bulk containers.

* * * * *